May 21, 1929.  ST. CLAIR BROMFIELD  1,713,945
ACCOUNTING AND FILING SYSTEM
Filed Aug. 30, 1919  3 Sheets-Sheet 3
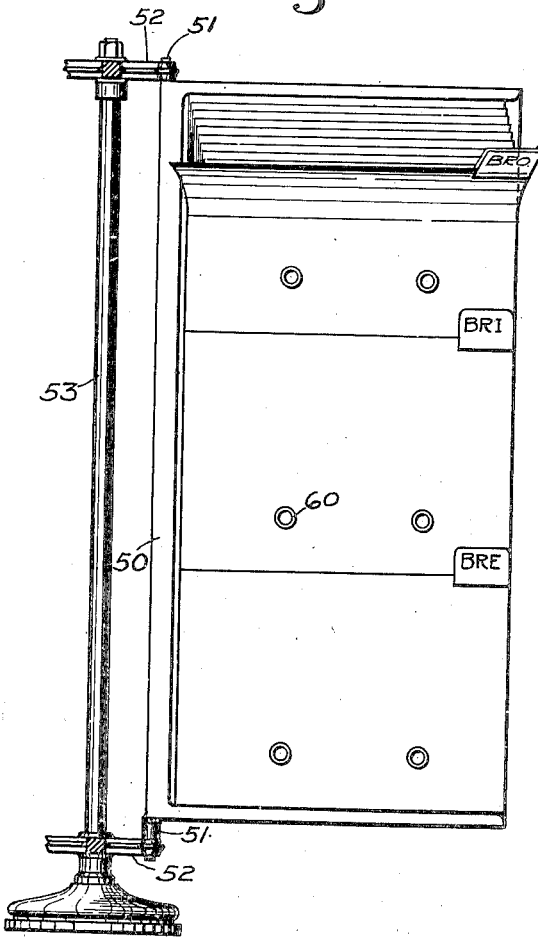
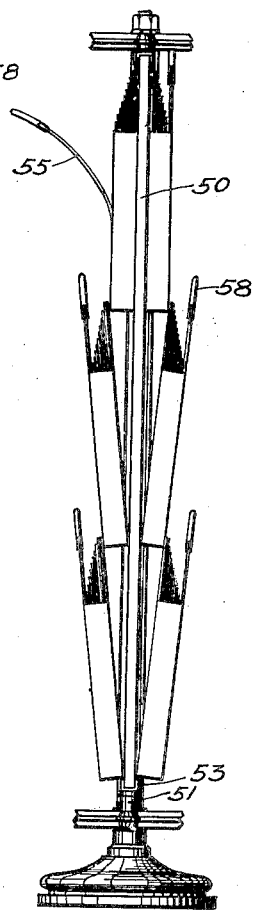
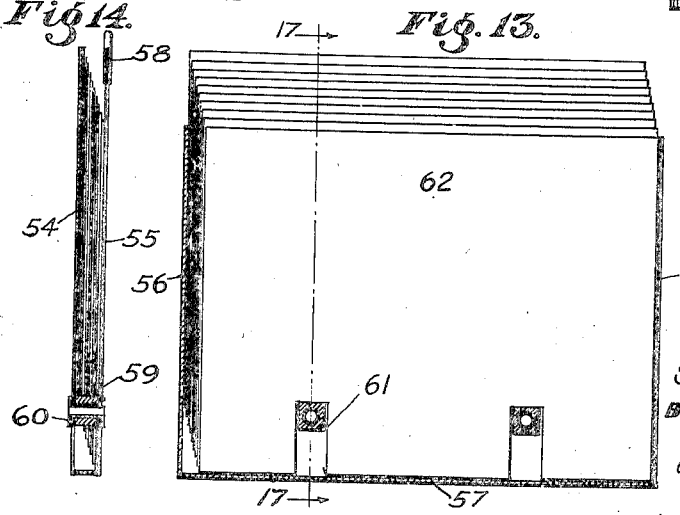
INVENTOR.
ST. CLAIR BROMFIELD,
BY
John H. Bruninga
HIS ATTORNEY.

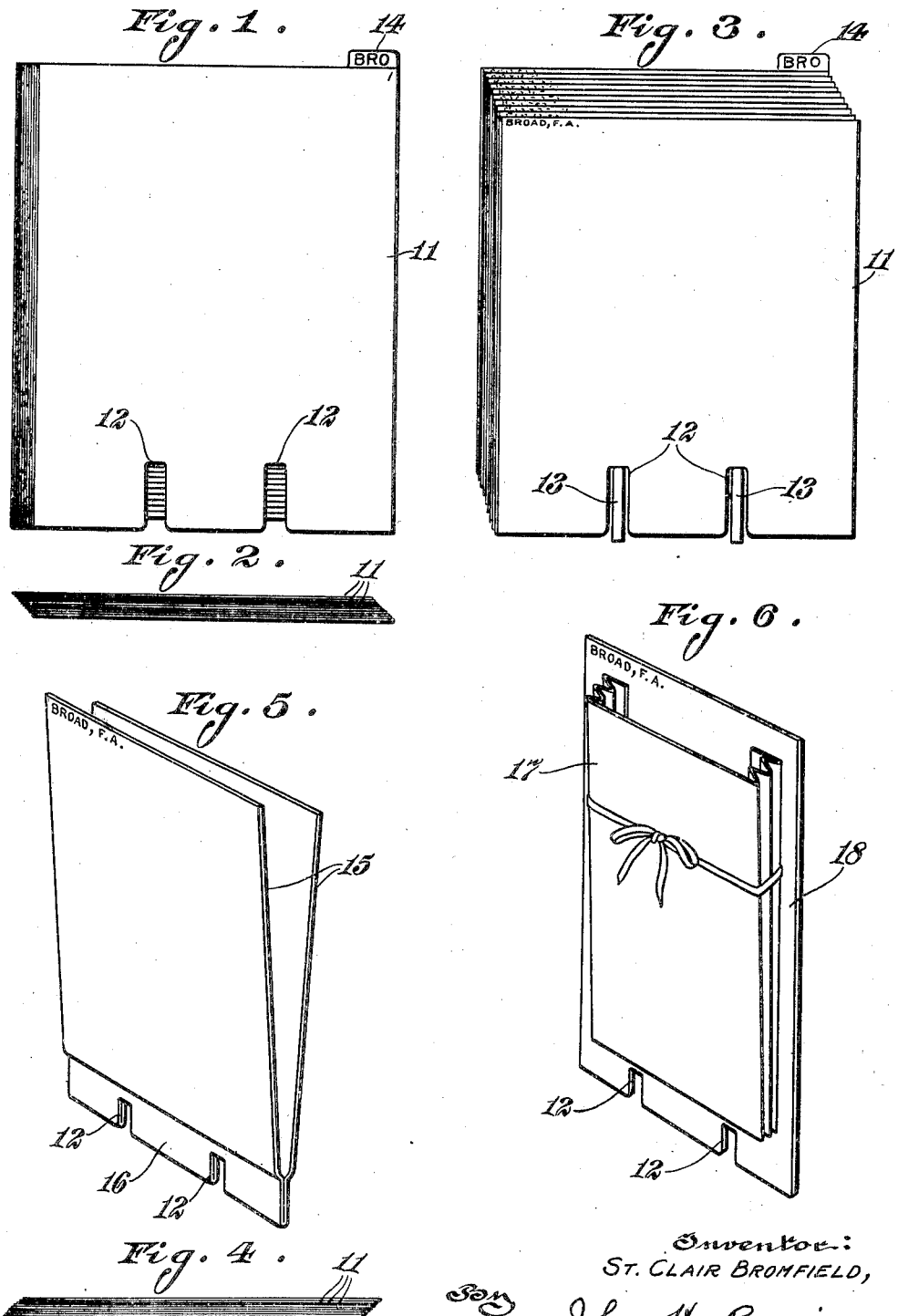

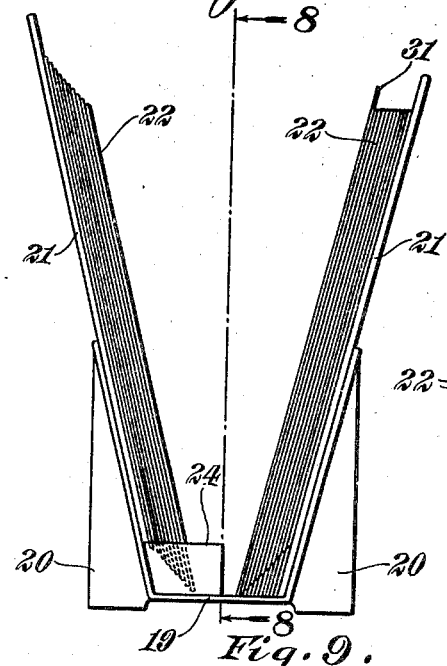
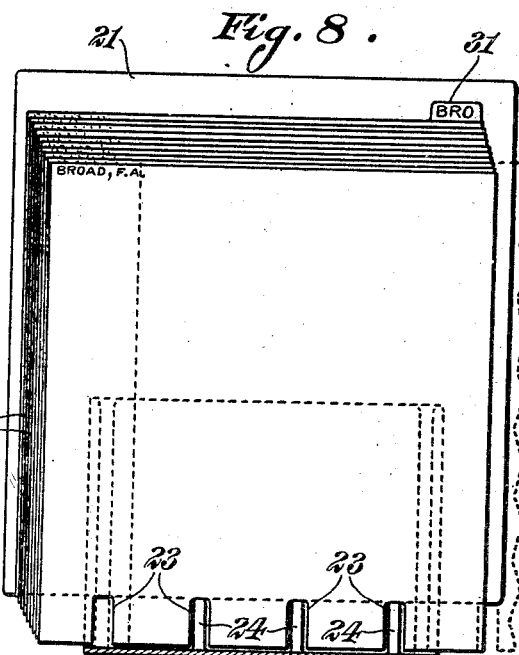
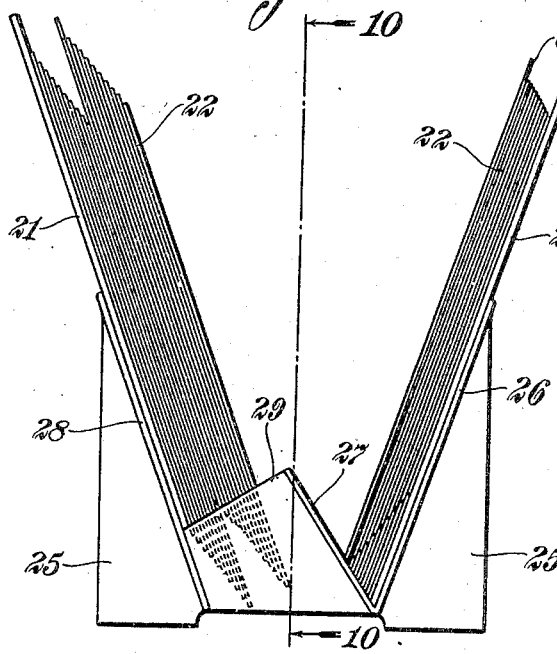
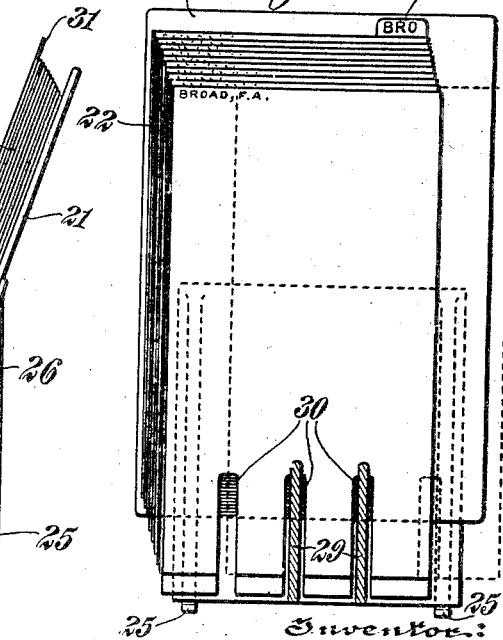

Patented May 21, 1929.

1,713,945

UNITED STATES PATENT OFFICE.

ST. CLAIR BROMFIELD, OF ST. LOUIS, MISSOURI, ASSIGNOR, BY MESNE ASSIGNMENTS, TO REMINGTON RAND INC., OF NEW YORK, N. Y., A CORPORATION OF DELAWARE.

ACCOUNTING AND FILING SYSTEM.

Application filed August 30, 1919. Serial No. 320,922.

This invention relates to accounting systems and more particularly to loose-leaf accounting systems. In loose-leaf accounting systems employing loose-leaves, cards, folders, etc., difficulty is experienced in quickly locating or finding the desired account, even with the special trays or racks used for that purpose. Such appliances require the leafing of many accounts other than the one required, which results not only in a loss of time but also wear and soiling of the accounts. This is to some extent obviated by the generous use of tabs, but since tabs must be spaced considerable distances in order to be visible, it necessarily follows that there will be a group of cards between tabs which must be handled in order to find a required card in that group.

One of the objects of this invention, therefore, is to provide an accounting system in which an assembled group of account cards has selective characteristics adapted to expose the faces of the cards at their edges so as to fully render visible the edge of every card in that group.

Another object is to provide an accounting system in which the selective characteristics of a group of cards are so arranged as to cause lateral displacements of the cards in the group at a side edge in order to permit ready opening of the group at the desired card.

Another object is to provide an accounting system in which the selective characteristics of the cards are so arranged as to permit offsetting of the desired card.

Another object is to provide an accounting apparatus employing such cards in which the cards not only have selective characteristics, but in which selecting means is provided for segregating such cards, permit the desired card to be readily isolated and permit offsetting of the desired card.

Further objects will appear from the detail description taken in connection with the accompanying drawings, in which:

Figure 1 is a face view of a group of assembled cards in normal position;

Figure 2 is a top edge view of Figure 1;

Figure 3 is a view similar to Figure 1, but showing the cards of the group in position to expose the edges thereof;

Figure 4 is a view similar to Figure 2, but showing another embodiment and arrangement for lateral displacement of the cards of a group;

Figure 5 is a perspective view showing the card or accounting element in the form of a folder;

Figure 6 is a perspective view showing the card or accounting element in the form of a pocket;

Figure 7 is an end view of a rack or tray adapted for the segregation of accounts and employing a modified form of card;

Figure 8 is a section on the line 8—8, Figure 7;

Figure 9 is a view similar to Figure 7, but showing another form of rack or tray;

Figure 10 is a section on the line 10—10, Figure 9;

Figure 11 is a side elevation of a panel showing an embodiment of this invention as applied to the panel system;

Figure 12 is an end view of the panel shown in Figure 11;

Figure 13 is a face view of one of the pockets or holders, with the front removed; and Figure 14 is a section on the line 17—17, Figure 11.

In the specification and claims, the term "card" is used in its broadest sense, so as to include ordinary cards, loose-leaves, sheets, or other accounting elements used in the keeping of accounts. The term "tray" is also used in its broadest sense so as to include holders, racks, etc., adapted for the holding and segregating of accounts.

Referring to the accompanying drawings, and more particularly to Figures 1, 2 and 3, an assembled group of cards comprises, in this particular embodiment, ten cards, although this number may be varied to suit requirements. Each card 11 is provided at its lower edge with one or more selective characteristics, the characteristics of the different cards in the group corresponding respectively to the positions of the cards in that group. In the embodiment shown, each card is provided with recesses 12, the vertical extents or depths of which vary in the different cards, and it will be noted that these depths decrease from front to back so that the extent of the characteristics of each card will define the position of the card in its group. In the particular embodiment shown, there are a pair of characteristics exposed along the bottom edge of the card, and these characteristics for a given card are duplicates for a purpose hereinafter to be described.

If a group of such cards is placed with their characteristics over a pair of selector bars or rods 13 and the cards are caused to drop by gravity over these bars, the cards in the group will drop to different extents in accordance with the extents or depths of the characteristics. Accordingly, as shown in Figure 3, the cards of the group will be arranged in overlapping relation so as to concurrently expose the front faces of the cards at their upper edges opposite the characteristics. If now the upper edges of the cards are provided with identifying characteristics, such as the name and initials of the account, such segregation will concurrently expose for full view, the names on all of the cards of the group.

The back card of the group or a separate card may be provided with a tab 14, so as to identify the group and this tab or division card may, if desired, be placed in front of the group. Furthermore, the corners of the cards may be identified numerically as shown. In view of the fact that there are provided duplicate characteristics for each card, each card of the group will be positioned at a plurality of spaced points, thereby preventing tipping of the card.

In order to permit quick selection of a desired card, in the segregated group, the cards of a group are laterally displaced by relative lateral or sidewise displacements of the characteristics along the edges of the several cards with respect to the group. As shown in Figure 2, where the desired card is to be isolated with the right hand at the right hand edge of the assembled cards, the cards of the group are displaced towards the left from front to back so that a finger of the right hand can take behind the card in front of the desired card and readily permit opening of the group at that point, providing protruding manipulative edges at the right hand side of the group. Where, however, the reverse operation is desired, the cards are offset from left to right, and from front to back of a group as shown in Figure 4. This is really the preferable form because it permits the right hand to be used to locate the tabs of the groups and remove the desired card while the left hand is used to open the group at the desired point.

In Figure 5, the card or accounting element is shown in the form of a folder, the sides 15 of which are joined to provide an edge 16, in which are formed the selective characteristics 12.

In Figure 6, is shown a pocket 17 formed on the front of a card 18, which is provided at its lower edge with the selective characteristics 12, while only one card is shown in each of Figures 5, and 6, it will be understood that the other cards of a group are formed to provide selective characteristics varying and corresponding respectively to the positions of the cards in the group.

Figures 7 and 8 show the application of the system to ledgers employing loose-leaves and which, as usual, are furnished with a rack or tray. The tray, in this particular embodiment, is of the U-form and comprises a base 19 having legs 20 and providing a U-shaped pocket for receiving the ledger back 21 and the leaves 22. These leaves are provided with selective characteristics 23 which are, in this particular embodiment, four in number for a purpose hereinafter to be described. The bottom of the rack is provided with a number (in this case three) of selector bars 24 which are spaced apart distances equal to the spacings of the characteristics and whose depths or extents are slightly greater than the depths or extents of the greatest characteristic on the card of a group.

In the use of this system, the ledger is opened in the usual way and stacked in the tray but with the characteristics of the group or groups to be segregated on the selector bars. This will cause the leaves of a group to be placed in overlapping relation thereby exposing the upper edges of all of the leaves or cards of a group and permitting ready selection of the desired card. It will be understood that the selective characteristics are so arranged as to cause lateral displacements of the cards at their side edges for the purpose of permitting ready selection.

When a desired account has been located, it can be offset by raising it and moving it to dotted position, Figure 8, until the characteristics again cooperate with the selectors; it will be noted that this offsetting does not disturb but maintains the effective selecting relation between the selective characteristics of the offset card and the selectors.

In the embodiment shown in Figures 9 and 10, a different form of segregating rack is shown, comprising, standards 25, a back 26, and a base 27 for receiving the section of the ledger back and leaves not required to be segregated and a back 28 for receiving the back and leaves of the portion of the ledger to be segregated. A series (in this case two) of selector bars 29 connect the standards, and the cards are each provided with three characteristics, 30, adapted for cooperation with the selectors 29.

The application of this form of tray will be obvious from the preceding discussion. The ledger is opened at the desired group as noted by its identifying tab 31 and the groups to be segregated are placed in cooperation with the selector bars 29; the cards in each group will then be thrown into overlapping relation so as to expose the edges of all of the cards of each group. The desired card can be readily located, selected and offset as shown in dotted lines, Figure 10.

In the constructions as above described and illustrated in Figures 7 to 10 inclusive and for the purpose of the claims, the upwardly extending portions of the U-shaped tray which support the backs 21 of a loose-leaf ledger are referred to as side members while the corresponding portions of the bottom 19 form what may be termed end members, the side members retaining the ledger backs or covers in supported and inclined position to provide access to the sheets which are also supported in inclined position having their lower edges engaging the end members. The portions 26 and 28 of Figure 9 form the side members while the portions 27 and 29 may be referred to as the end members, the vertically extending supporting or guide bars 24 in Figure 7 and 29 in Figure 9 forming part of the end members.

Referring now to Figures 11 to 14 inclusive, 50 designates a panel which is as usual provided with pintles 51 for mounting the same on the arms or flanges 52 of a stand 53. Mounted on each side of the panel in any suitable manner are a series of folders or pockets providing each a compartment for a group of cards. Each folder or pocket comprises a back 54, a front 55, ends 56 and a bottom 57. The front 55 is unattached somewhat below its upper edge so as to permit the same to be flexed forwardly and is provided with a tab 58. Arranged near the bottom of the pocket are selectors 59, which may be in the form of blocks secured in position by eyelets 60 and adapted to cooperate with the characteristics 61 on the cards 62, these characteristics varying progressively in extents or depths corresponding to the positions of the cards in the group; accordingly every group of cards is positioned in its pocket or compartment in overlapping relation with all of the upper faces of the cards exposed. One or both sides of the panel may have a series of these pockets arranged in overlapping relation and mounted thereon and in practice, the pockets can be arranged in close overlapping relation with the tab of one pocket slightly below the tab of the next pocket.

The application of this invention will be obvious. A panel which is arranged to carry a large number of cards has these cards arranged in groups, each identified by its tab or primary identification. When it is desired to select or inspect a particular account in a group, it is only necessary to pull forward the front as shown in Figures 11 and 12 when all of the upper edges of the cards of that group will be exposed and a desired account can be readily inspected or withdrawn. For permitting ready withdrawal, the cards of a group are spaced laterally as shown so as to permit ready opening of a group at the desired card.

It will, therefore, be seen that the invention accomplishes its objects. The system is simple in construction and operation and the characteristics of the card are such as to not require great duplication in dies or cards. The cards can be kept in stock and can be numbered, as in this particular embodiment from "1" to "10" inclusive so that each number will correspond to a certain characteristic. Accordingly in making up a system, the cards can readily be arranged in groups numerically, and they can have their identifying characteristics applied thereto alphabetically. Accordingly, it is only necessary to keep in stock ten different kinds of cards. In practice, the use of ten or more cards for a group will make a group sufficiently thick so as to space the tabs sufficiently where they can be readily observed.

It is obvious that various changes may be made in the details of construction without departing from the spirit of this invention; it is, therefore, to be understood that this invention is not to be limited to the specific details shown and described.

Having thus described this invention what is claimed is:

1. In an accounting system, a series of account cards, each having slots adjacent one edge thereof, a support member adapted to engage in the slots of the successive cards, the slots being so positioned that the several cards are thus arranged with their side edges in progressive sidewise displacement.

2. In an accounting system, a series of account cards each having a slot adjacent one edge thereof, a support member adapted to engage in the slots of the successive cards the slots being so positioned that the several cards are thus arranged with both their side edges and top edges arranged in progressive, overlapping position.

3. The combination with a temporary binder comprising binding members, of a pair of holders comprising side members and end members disposed oppositely, said side members being adapted to support said binding members in separated relation, said end members being formed to receive a plurality of sheets for support in edgewise relation, one of said end members and said sheets being formed for cooperation to support said sheets in successive offset indexed relation.

4. The combination with a temporary binder having binding members and a plurality of sheets, of a pair of holders comprising side members and end members disposed oppositely, said binding members being supported by said side members in separated relation, said sheets being supported in edgewise relation on said end members, said sheets and at least one of said end members being formed for cooperation to support said sheets in offset visibly indexed relation.

5. The combination with a temporary binder having binding members and a plurality of sheets, of a pair of holders including side members for supporting said binding members, and end members supporting said sheets in edgewise relation, and means for offsetting said sheets in visible indexed relation on one of said end members.

6. The combination with a temporary binder having binding members, of a pair of holders including side members and end members disposed oppositely, said side members supporting said binding members, and means forming part of said end members formed to receive and support a plurality of sheets in offset visible indexed relation.

7. The combination with a temporary binder having binding members, of a pair of holders including side members and end members disposed oppositely, said side members supporting said binding members, and a plurality of sheet-supporting ledges forming part of said end members having supporting cooperation with part of the edge portions of a plurality of sheets to support said sheets in offset visible indexed relation.

8. The combination with a temporary binder having binding members, of a pair of holders including side members and end members disposed oppositely, said side members supporting said binding members, a plurality of sheet-supporting members mounted on at least one of said end members in spaced relation, and a plurality of sheets for said binder having portions for supporting engagement with said sheet-supporting members to support said sheets in visible indexed relation in said holders.

9. The combination with a temporary binder having binding members, of a pair of holders including side members and end members disposed oppositely, said side members supporting said binding members, a plurality of sheet-supporting bars extending transversely of at least one of said end members in spaced parallel relation, and a plurality of sheets having means on one edge portion for engagement with said bars to support said sheets thereon in edgewise visible indexed relation.

10. In a support for temporary binders, the combination of a pair of holders having side and end members disposed oppositely, one of said end members having parallel spaced sheet-supporting ledges thereon.

11. In a support for temporary binders, the combination of a pair of holders having side and end members disposed oppositely, and a plurality of spaced parallel bar members forming the sheet-supporting means on one of said end members.

In testimony whereof I affix my signature this 2d day of August, 1919.

ST. CLAIR BROMFIELD.